J. C. NYE.
Car Axle.

No. 42,105. Patented Mar. 29, 1864.

UNITED STATES PATENT OFFICE.

JOHN C. NYE, OF CINCINNATI, OHIO.

IMPROVEMENT IN RAILROAD-CAR AXLES.

Specification forming pa t of Letters Patent No. 42,105, dated March 29, 1864.

*To all whom it may concern:*

Be it known that I, JOHN C. NYE, of Cincinnati, in the county of Hamilton, in the State of Ohio, have invented a new and Improved Railroad-Car Axle; and I do hereby declare that the following is a full and exact description thereof, reference being had to the accompanying drawings, and to the letters of reference marked thereon.

The nature of my invention consists in providing two distinct axles working one within the other, but combined, forming a single axle, in the manner hereinafter described.

Figure 1:
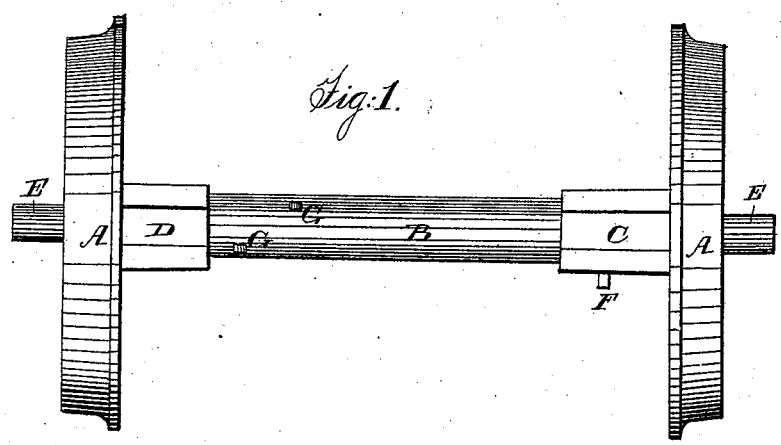
Figure 2:
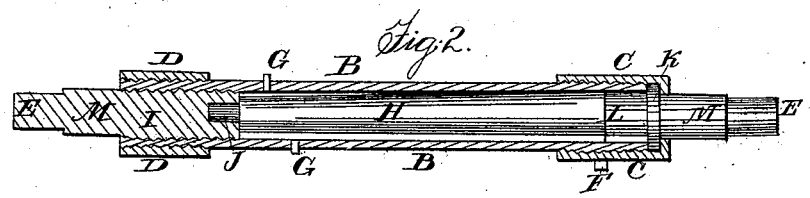
Figure 3:
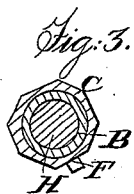

Figure 1 is a perspective view of the axles as combined with wheels attached and ready for use. Fig. 2 is a sectional view, in which is shown the manner of combining the axles. Fig. 3 is a cross-section of axle at line L in Fig. 2.

A is the wheel. B is the cylindrical or outside axle, to which the left wheel is firmly attached. C is a sleeve, which screws onto the end of axle B, having a shoulder or lip upon the inside which acts against K, thereby preventing the wheels from spreading. D is a nut or collar to support the left end of axle B. E is the end of the combined axle. F is a small set-screw to secure sleeve C in its place. G is a screw or other appliance for the admission of oil to the axle H. H is the right or inner axle. I is the left arm of B. J is a journal working in a bearing in I, as shown in Fig. 2. K is a collar around H, working between the end of B and the shoulder or lip of sleeve C, securely holding H in its place. L is the bearing of H upon the inside of B. M is the points of the combined axle at which the wheels are attached. C, D, H, or I may be made longer or shorter than shown in the drawing, as circumstances require. B may also be used as either the right or left axle, as desired.

From the above may be seen a full description of my invention.

What I claim as my invention, and desire to secure by Letters Patent, is—

The combination and arrangement of the outer hollow axle, B, inner axle, H, collar K, and screw sleeve C, secured in place by a set-screw, F, or its equivalent, said axles overlapping as far as practicable the whole distance between the wheels, substantially as and for the purpose herein specified.

JOHN C. NYE.

Witnesses:
    EDWD. F. RICE,
    D. S. M. FORD.